United States Patent [19]

Kubota et al.

[11] 4,356,729

[45] Nov. 2, 1982

[54] FLUID LEVEL DETECTOR

[75] Inventors: Hitoshi Kubota, Fujisawa; Toshiyuki Takahashi, Hayama, both of Japan

[73] Assignees: Nissan Motor Co., Ltd.; Nippon Air Brake Co., Ltd., both of Japan

[21] Appl. No.: 155,043

[22] Filed: Jun. 2, 1980

[30] Foreign Application Priority Data

Jun. 7, 1979 [JP] Japan ................................ 54-71487

[51] Int. Cl.[3] ...................... G01F 23/10; G01F 23/12

[52] U.S. Cl. ........................................ 73/308; 73/313; 200/84 C; 340/59

[58] Field of Search ........................... 200/61.2, 84 C; 73/DIG. 5, 313, 308; 340/624, 59

[56] References Cited

U.S. PATENT DOCUMENTS

| | | | |
|---|---|---|---|
| 3,163,731 | 12/1964 | Lyden | 200/84 C |
| 3,609,680 | 9/1971 | Belart | 340/59 |
| 3,654,956 | 4/1972 | Tsuoouchi | 340/59 |
| 3,751,614 | 8/1973 | Jones | 200/84 C |
| 3,751,616 | 8/1973 | Innes | 200/84 C |
| 3,947,813 | 3/1976 | Uemura | 340/59 |
| 3,964,079 | 6/1976 | Katagiri | 340/59 |
| 4,037,193 | 9/1977 | Uemura | 340/59 |
| 4,305,285 | 12/1981 | Kubota | 73/308 |

FOREIGN PATENT DOCUMENTS

| | | |
|---|---|---|
| 2339279 | 2/1974 | Fed. Rep. of Germany . |
| 1506505 | 12/1967 | France . |
| 2011298 | 2/1970 | France . |

*Primary Examiner*—Anthony V. Ciarlante
*Assistant Examiner*—Denis E. Corr
*Attorney, Agent, or Firm*—Thompson, Birch, Gauthier & Samuels

[57] ABSTRACT

A fluid level detector comprising a cylindrical member which includes a mounting portion fitting in the opening of a fluid reservoir and a float guide portion extending downwardly from the mounting portion. A float, provided with a magnet, is slidably fitted over the float guide portion. A lead switch is disposed in the float guide portion. A terminal is connected to the lead switch via a lead 18. A lid member is mounted to close the opening of the reservoir. A terminal holder is integrally formed on the cylindrical member. The lid member includes an upper cover covering the upper portions of the mounting portion and the cylindrical member, and a lower cover. In assembly, after interposing the terminal holder between the upper and lower covers, the cylindrical member and the lid member are mounted to the reservoir as a unit.

4 Claims, 9 Drawing Figures

47 50 29 30 6 23 49 21 20 11 32 22 33 19' 31 19 52 53 38 51 36 25 1 44 43 48 5 8 37 7 2 18 9 10 15 12 13 16 14 17 3 4

FLUID LEVEL DETECTOR

BACKGROUND OF THE INVENTION

The present invention relates to a fluid level detector which establishes an electrical contact when the liquid level drops below a predetermined level, and more particularly to such a fluid level detector for use with an automotive vehicle master cylinder.

Conventionally, fluid level detectors include a pair of mechanical contacts connected to a float and a lid member, to establish an electrical contact. However, this type of device frequently malfunctions because brake fluid accumulates between the contacts, causing erroneous electrical signals. Therefore, to avoid this problem, devices utilizing a lead switch magnetically operated have been proposed.

Such devices have been formed of two separate pieces—the contact switching portion which fits into an opening in the fluid reservoir and a cap which fits thereover for retaining the switching portion in position and for housing the electrical wiring connections. Therefore, installing the device is awkward and cumbersome, requiring two hands.

SUMMARY OF THE INVENTION

The fluid level detector of the present invention includes, a body portion having a magnetically operated electrical switch therein, a mounting portion for mounting to an automotive vehicle master cylinder, a magnet slidably positioned on the body portion to actuate the switch in response to the position of the magnet on the body portion and a lid having external electrical connections therein. The lid and body portion are assembled together to form an integral unit for convenience in installing in a master cylinder reservoir.

An object of the present invention, therefore, is to provide a fluid level detector which is simple in installation.

BRIEF DESCRIPTION OF THE DRAWINGS

FIG. 3(*b*) is a sectional view taken along line A—A of FIG. 3(*a*);

FIG. 3(*c*) is a top view;

FIG. 4(*b*) is a sectional view taken along line E—E of FIG. 4(*a*);

FIG. 4(*c*) is a top view; and

FIG. 4(*d*) is a bottom view.

DESCRIPTION OF THE PREFERRED EMBODIMENT

Figure 1:
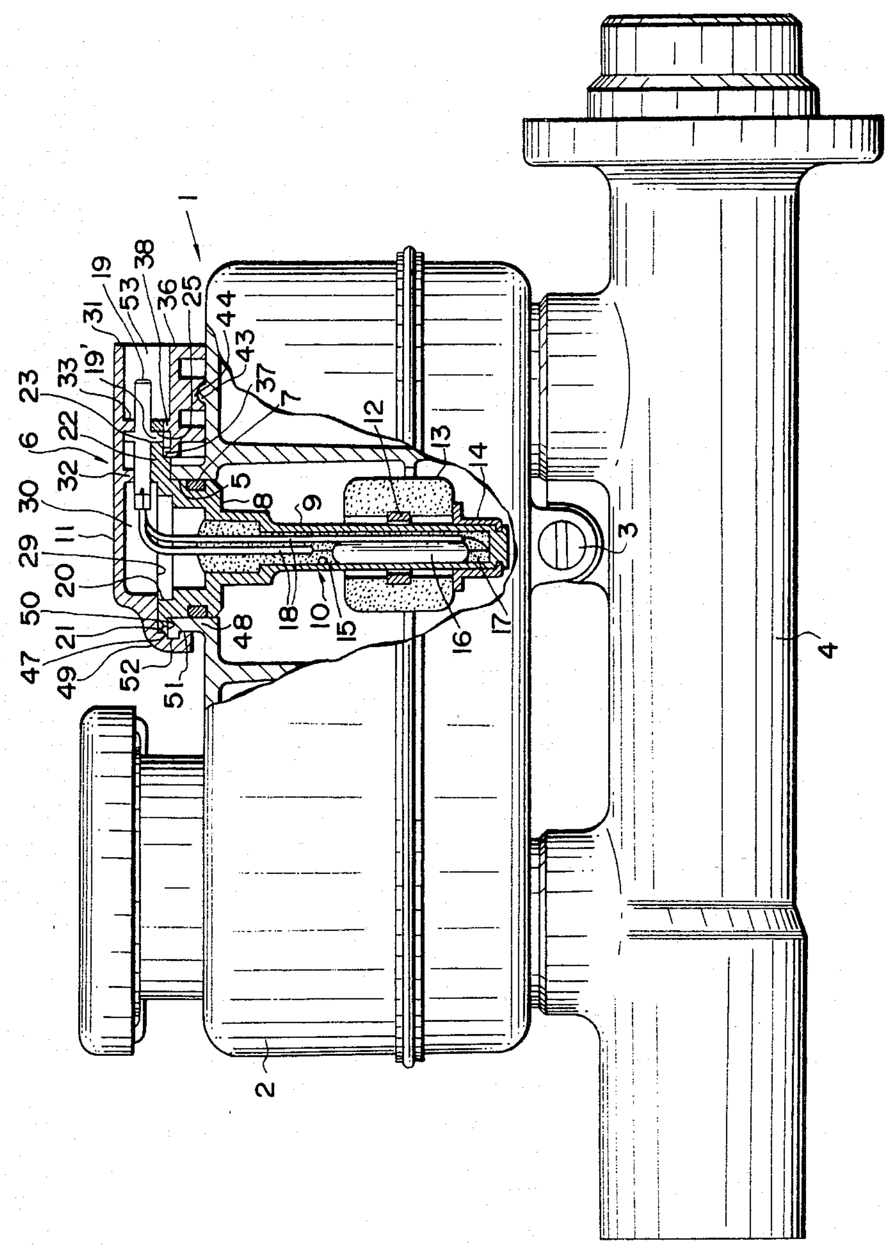
FIG. 1 is a side view, of a master cylinder having a partial cutaway showing, in section, an embodiment of a fluid level detector according to the present invention.

Referring to FIG. 1, there is shown a tandem master cylinder 1 for an automobile, having a fluid level detector of the present invention installed therein through an opening portion 5 of a reservoir 2 bolted to a cylinder main body 4 by a bolt 3. The fluid level detector 6 comprises a cylindrical member 10 of a synthetic resin having a mounting portion 8 fitting in an opening portion 5 of the reservoir 2 via a sealing member 7, a float guide portion 9 extending downwardly from said mounting portion 8 and a lid member 11 of a synthetic resin designed to cover the upper portion of the cylindrical member 10.

Slidably fitted on the float guide portion 9 of the cylindrical member 10 is a float 13 provided with a magnet 12, and a stop 14 for retaining the float thereon. Within an internal bore 15 of the float guide portion 9, a lead switch 16 is fixedly mounted by a filler 17 in such a position that it closes when the float 13 contacts the stop 14. To the lead switch 16 a terminal 19 is connected via a pair of leads 18.

Figure 3A:
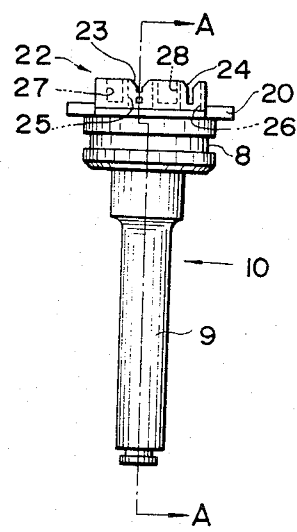
FIG. 3(*a*) is a front view of the detector of the present invention.
Figure 3B:
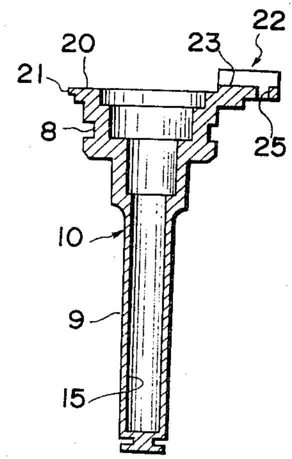
Figure 3C:
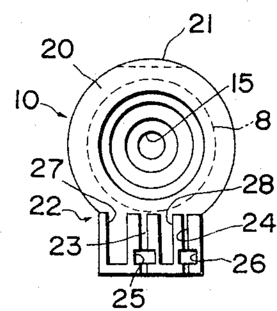
Figure 4A:
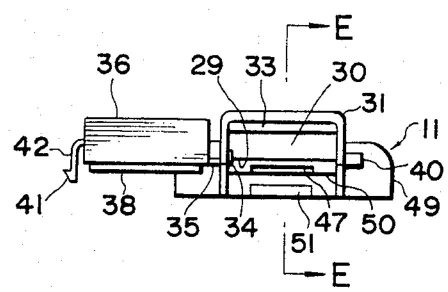
FIG. 4(*a*) is a front view of the lid member used in the above-mentioned embodiment with the lower lid in its unfastened position.
Figure 4B:
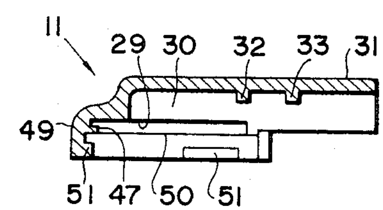
Figure 4C:
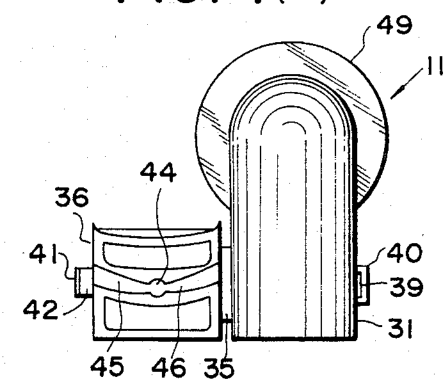
Figure 4D:
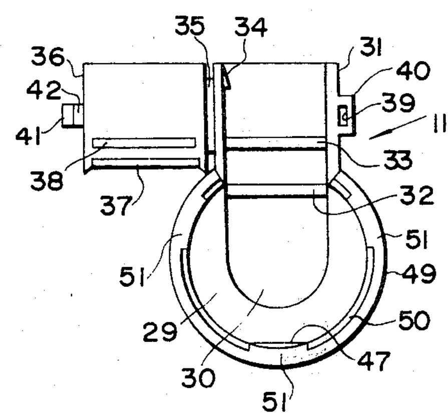

Referring to FIGS. 3(*a*)-3(*c*), the cylindrical member 10 is formed at the periphery of an upper edge of the mounting portion 8 with an annular flange 20 that is provided with an engaging portion 21 and a terminal holder 22 arranged in diametrically opposite positions. The engaging portion 21 is formed by cutting a recess in the lower edge portion of the flange 20 having a shape defined by an arc and a chord, as best shown in FIG. 3(*c*). The terminal holder 22 is formed with grooves 23 and 24 for receiving the terminals 19 and with holes 25 and 26, at portions of the respective grooves for receiving small abutments 19' of each of the terminals 19. 27 and 28 designate cutouts formed for ease of making the cylindrical member 10.

Referring to FIGS. 4(*a*)-(*d*), the lid member 11 comprises a concave portion 30 formed with a flat portion 29 with which the mounting portion 8 is adapted to contact, and, as shown in FIG. 4(*b*), an upper cover 31 integrally formed with the concave portion and extending to the right thereof. This upper cover 31 has a generally U-shaped configuration, and includes projections 32 and 33 formed on the inner wall on the side near the concave portion 30 which is adapted to contact with the top surface of the terminal holder 22, and a claw-like projection 34 on the inner wall on the side opposite the concave portion 30 for preventing the withdrawal of a circuit joint (not illustrated). Furthermore, a lower cover 36 is integrally formed with the bottom edge of the upper cover 31 via a thin diaphragm portion 35, and comprises projections 37 and 38 which are adapted to contact the bottom surface of the terminal holder 22. The lower cover 36 includes a leg 42 having a claw 41 adapted to engage a hole 39 of a projection 40 formed on the side of the upper cover 31.

As shown in FIGS. 1 and 4(*c*), the lower cover 36 is formed, at a mating surface with the upper surface of the reservoir 2, with a concave portion 44 adapted to receive a ball-like projection 43 formed on the upper surface of the reservoir 2, and with guide grooves 45 and 46 to guide the ball-like projection to the concave portion.

The lid member 11 has a projection 47 formed on the side opposite the upper cover 31 to engage the cylindrical member engaging portion 21. The lid member 11 is formed at the lower edge portion thereof with a skirt portion 49 adapted to surround the upper periphery of a cylindrical portion 48 defining the opening portion 5 of the reservoir 2. This skirt portion 49 has a flat portion 50 adapted to contact the upper surface of the cylindrical portion 48 flush with the lower surface of the projection 47, and three projections 51 at respective spaced locations on the inner periphery on the lower edge thereof. To mate with the three skirt portion projections 51, three projections 52 are formed on the upper edge outer periphery of the cylindrical portion 48.

Figure 2:
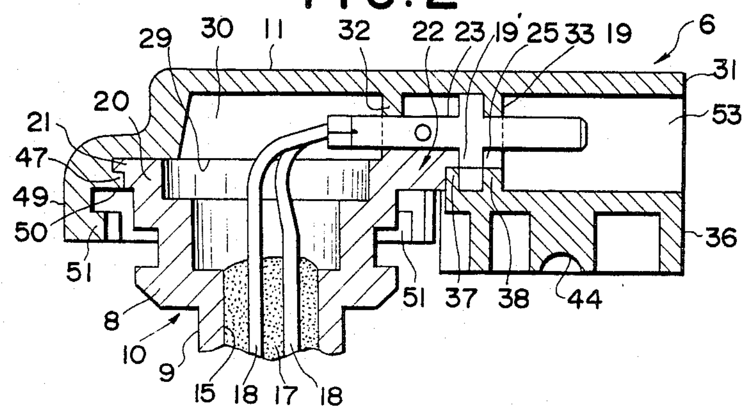
FIG. 2 is an enlarged fragmentary view of the level detector of FIG. 1.

The above-mentioned cylindrical member 10 and lid member 11 are connected as follows. The lead switch 16, the float 13, and their associated parts are assembled with the cylindrical member 10, the terminals 19 fitting in the grooves 23 and 24. Next, the upper end portion of the cylindrical member 10 is fitted into the concave portion 30 with the engaging portion 21 engaging the lid member projection 47, the upper surface of the flange 20 and the upper surface of the terminal holder 22 contacting the respective projections 32 and 33 of the upper cover. The thin diaphragm portion 35 is flexed to insert the leg 42 of the lower cover 36 into the hole 39 of the projection 40 so that the claw 41 engages the projection. This causes the upper surface of the terminal holder 22 to contact the projections 32 and 33, and the lower surface of the terminal holder 22 to contact the projections 37 and 38, so that the engaging portion 21 engages the lid member projection 47 as illustrated in FIG. 2.

A circuit connection hole 53 is designed to receive a circuit connector, not illustrated.

The fluid level detector 6 is mounted to the reservoir 2 in the following manner.

The device is inserted into the reservoir 2 with its skirt portion projections 51 passing through spaces between the reservoir cylindrical portion projections 52. This causes the cylindrical member mounting portion 8 to fit in the opening 5 and the lower surface of the mounting portion flange 20 and the flat portion 50 to contact the cylindrical portion upper edge surface and the upper edge of the projections 52.

Rotating the device 6 causes the cylindrical portion projections 52 to be located between the flat portion 50 and the upper surfaces of the projections 51 and also causes the ball-like projection 43 of the reservoir 2 to engage one of the guide grooves 45 or 46. Further rotation of the device 6 will snap the ball-like projection 43 into the concave portion 44.

According to the above-described embodiment, because the fluid level detector 6 is of a unitary construction comprising the cylindrical member 10 and the lid member 11, its installation into the master cylinder reservoir is greatly simplified. More importantly, however, the risk of accidentally pulling the connecting leads 18 from the terminals 19 or from the cylindrical member 10 is totally eliminated.

By joining the cylindrical member 10 to the lid member 11 with the engaging portion 21 engaging the projection 47 and with the terminal holder 22 interposed between the upper cover 31 and the lower cover 36, the assembly procedure is greatly simplified. The cylindrical member 10 is easily separated from the lid member 11, when necessary however, by disengaging the lower cover claw 41 from the projection 40.

Since the terminal holder 22 is integrally formed with the flange 20 of the cylindrical member 10 and projects outwardly therefrom it is possible to interpose the terminal holder 22 between the upper cover 31 and the lower cover 36 to use the terminal holder 22 as a means for joining the cylindrical member to the lid member simplifying the construction.

Various embodiments according to the present invention are available. For example, the grooves 23 and 24 may be provided with small projections on the inner walls thereof to securely hold the terminals 19. Instead of forming the upper cover 31 and the lower cover 36 as an integral unit via the thin diaphragm portion 35, it is possible to slidably fit the lower cover to the upper cover with the terminal holder 22 interposed therebetween forming a claw or the like on the lower cover to detachably engage the lower cover to the upper cover. In order to allow the temporary fitting of the cylindrical member 10 to the lid member 11 prior to interposing the terminal holder 22 between the upper cover 31 and the lower cover 36, it is possible to form a small projection on the inner wall of the lid member concave portion 30 to allow the cylindrical member flange 20 to engage the small projection.

According to the present invention, since the terminal holder that receives the terminal is integrally formed with the cylindrical member, and the terminal holder is interposed between the upper cover and the lower cover, installation of the fluid level detector is simplified. Additionally, since the assembling work involves connecting the terminal of the lead switch to the terminal holder of the cylindrical member and interposing the terminal holder between the upper cover and the lower cover, assembly thereof has been simplified.

What is claimed is:

1. A fluid level detector assembly comprising:

a cylindrical member including an upper mounting portion adapted to be received in the opening of a fluid reservoir, said cylindrical member having a float guide portion adapted to extend downwardly into the reservoir, a terminal holder integral with and extending generally radially from said mounting portion of said cylindrical member, said terminal holder having a generally upwardly facing surface with a plurality of recesses therein for receiving terminals;

a float having a magnet disposed therein, said float being slidably mounted on said float guide portion, a switch disposed within said float guide portion, said switch being responsive to the position of said magnet;

terminals connected to said switch via leads, said terminals being supported in said recesses of said terminal holder; and a lid member comprising:

an upper cover having a terminal retaining portion retaining the upper sides of said terminals in said recesses in said terminal holder; and a lower cover connected to said upper cover and provided with a terminal holder retaining portion contacting the lower side of said terminal holder;

said upper cover and terminal holder cooperatively clamping said terminals between them and in place in said recesses on said terminal holder with said terminal holder abutting both said upper and lower covers;

whereby said cylindrical member with said leads extending from said switch mounted therein to terminals supported in said recesses of said integral terminal holder is secured to said lid member and the resultant assembly unit may be secured in the opening of a fluid reservoir.

2. In a fluid level detector assembly having a cylindrical member including a mounting portion adapted to be received in the opening of a fluid reservoir, said cylindrical member having a mounting portion, a float guide portion which extends into said reservoir and on which a float having a magnet is slidably fitted, a switch disposed within said float guide portion, said switch being responsive to the position of said magnet, terminals connected to said switch via leads, and a lid member closing said fluid reservoir opening, the improvement comprising:

a terminal holder integral with and extending generally radially from said mounting portion of said cylindrical member, said terminal holder having a plurality of recesses in a surface thereof, said terminals being received in said recesses; and said lid member comprising:

an upper cover having a recess for receiving and retaining said mounting portion of said cylindrical member and having a terminal retaining portion retaining said terminals in said recesses in said surface of said terminal holder; and a lower cover connected to said upper cover and provided with a terminal holder retaining portion contacting the side of said terminal holder opposite the side having said recesses therein;

said upper cover and terminal holder cooperatively clamping said terminals between them and in place in said recesses on said terminal holder with said terminal holder abutting both said upper and lower covers;

said lid member fitting on said cylindrical member and locking in place thereon with said upper and lower covers connected together, said connected upper and lower covers cooperating to hold said terminal holder between them with said terminals in said recesses in said terminal holder and said lid member having means for locking said lid member in place on said fluid reservoir opening.

3. A fluid level detector assembly as claimed in claim 1 or claim 2, wherein said lid member has means for making a bayonet connection to said reservoir opening, and said lower cover has a concave portion sized and shaped to receive a ball-like projection formed on the upper surface of said fluid reservoir.

4. A fluid level detector assembly as claimed in claim 1 or claim 2, wherein said upper and lower covers are integrally formed to each other by a hinge member and have a connector also formed integrally therewith.

* * * * *